W. C. L. LEFELDT & C. G. O. LENTSCH.
Assignors to T. BERGNER.
CENTRIFUGAL MACHINE FOR CREAMING MILK.
No. 10,441. Reissued Jan. 29, 1884.
—Fig. 1—
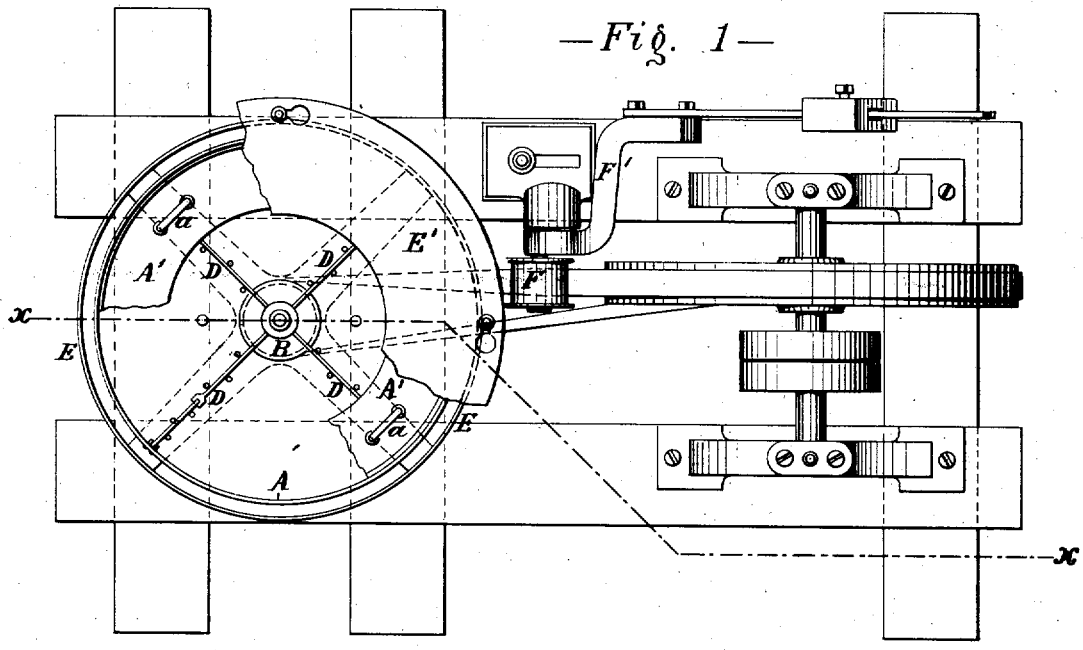
—Fig. 2—
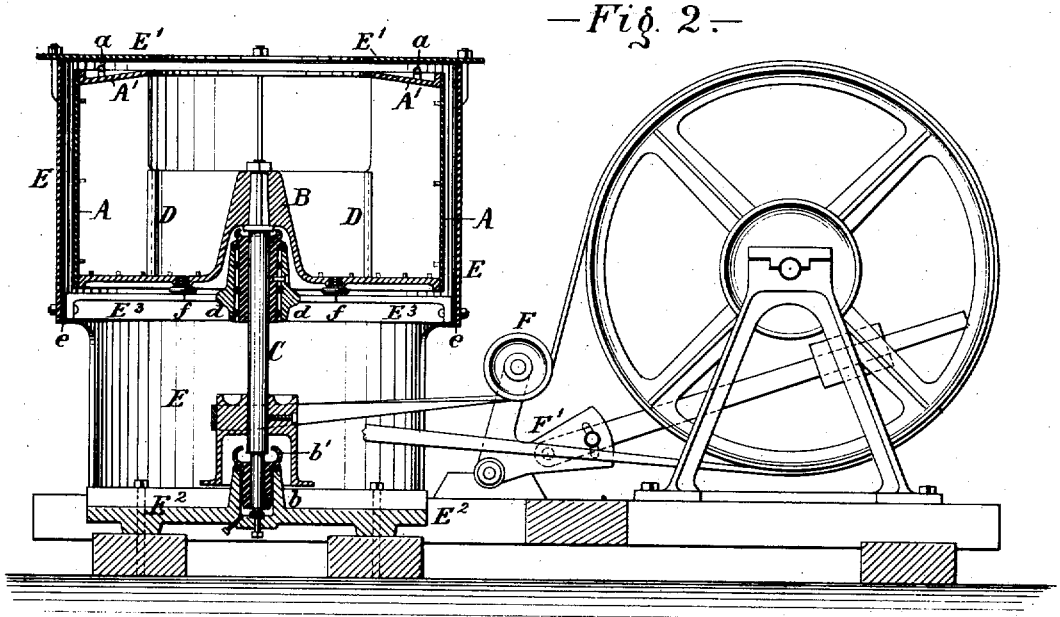
Witnesses:
Coleman Sellers
Thos. T. Collins
Inventors:
W. C. L. Lefeldt.
C. G. O. Lentsch.
By Theodor Bergner.
Attorney.

UNITED STATES PATENT OFFICE.

WILHELM C. L. LEFELDT AND CARL G. O. LENTSCH, OF SCHONINGEN, GERMANY, ASSIGNORS TO THEODORE BERGNER, OF PHILADELPHIA, PA.

CENTRIFUGAL MACHINE FOR CREAMING MILK.

SPECIFICATION forming part of Reissued Letters Patent No. 10,441, dated January 29, 1884.

Original No. 195,515, dated September 25, 1877. Application for reissue filed May 18, 1879. Patented in France March 13, 1877, No. 117,499; in England March 16, 1877, No. 1,074; in Italy May 25, 1877, No. 9.246; in Germany July 4, 1877, No. 3.212; in Denmark August 13, 1877, and in Austria, August 21, 1877, No. 24,486.

*To all whom it may concern:*

Be it known that we, WILHELM C. L. LEFELDT and CARL G. O. LENTSCH, both of Schöningen, in the Duchy of Brunswick and Empire of Germany, have jointly invented certain new and useful Improvements in Centrifugal Machines for Creaming Milk, of which improvements the following is a specification.

These improvements are substantially comprised in the British Letters Patent No, 1,074, dated March 16, 1877, and sealed August 21, 1877, taken out by us through our agent, Gerard Wenzeslaus von Nawrocki, of Berlin, in Prussia.

By "creaming milk" we mean the process of separating from it the richer particles constituting its cream, the most familiar and homely apparatus for which process is the shallow open milk-pan, in which the fresh milk is set, in a cool sheltered place, until, during a length of time varying from twelve to forty-eight hours, or even more, the milk spontaneously undergoes a change, the oily globules rising to the surface and forming a thin horizontal stratum, well defined by color and consistency from the thinner bluish body of milk below, and from this thinner body the "cream" is removed by the simple process of "skimming." The milk from different animals being of variable composition, the spontaneous separation in this natural process varies both as to the time in which it is effected and the condition in which the constituents are left; and hence, aside from the delays and the space required where large quantities of milk are creamed, great care and attention must be given to the small quantity of cream furnished from each pan, in addition to the trouble involved in removing, as far as possible, the impurities which unavoidably accrue in milking and during the subsequent exposure in the open pans, so that in collecting a quantity of cream for making butter there is great liability to the deterioration of the entire mass by the inferior condition of a small portion. To avoid these difficulties and to facilitate and economize dairy operations, as well as to obtain a better average quality of products, repeated attempts have been made to separate the cream from the milk by mechanical means, and different appliances have been proposed for this purpose, some of such appliances comprising the employment of centrifugal force; but prior to our invention all of these attempts, so far as we know, either failed entirely or gave unsatisfactory results and were abandoned, all of the experimenters, except ourselves, falling back upon the primitive system of spontaneous gravitation, and confining themselves in practice to such expedition and facilitation of this natural process as can be effected by reduced temperatures. The separation of cream from milk could be effected in a centrifugal machine, the rapid rotation of which throws the milk (which has a greater specific gravity than the cream) out toward the wall of the machine in a vertical belt, while the cream, being lighter, collects in a vertical annulus against the inner side of this belt of milk, the two vertical strata thus established continuing distinct so long as the machine is kept in rapid rotation. If, however, the machine is stopped abruptly or with a jerk, the two vertical strata would fall together into the center of the machine, the outer and heavier wall of milk tumbling over upon the inner belt of cream, so that the separation was entirely effaced. Upon this discovery we based our invention, the object of which is, after having effected the separation of the cream from the milk by centrifugal force, to maintain this separation while the machine is stopped, so that after stopping the machine the cream can be removed by a simple skimming operation.

To this end our invention consists in certain improvements in apparatus for the conduct of said process, the construction and operation of which apparatus is hereinafter described, and is illustrated in the accompanying drawings, which form part of this specification, and in which—

Figure 1 is a plan view of said apparatus, the cover and drum being partially broken away, to show the arrangement of certain interior parts; and Fig. 2 is a vertical longitudinal section through the same at the line *x x* of Fig. 1.

With our improved apparatus the operation of creaming milk consists in placing the fresh milk in the drum of a centrifugal machine of proper construction, which drum is started at a slow rate of rotation, which rate is increased until the maximum is reached, and at this maximum velocity the rotation of the drum is maintained for a short time—say about twenty minutes—when the speed of the drum is allowed to subside gradually until it "dies out" and the drum slowly comes to a state of rest without jar or shock. A few minutes after such stoppage of the drum the cream may be skimmed off and the milk then removed, this operation having the following two marked stages, to wit: First, while the drum charged with milk is attaining and maintained at its maximum velocity the impurities and foreign matter contained in the milk are gradually thrown outward against the wall of the drum, and will be found adhering thereto at the end of the process. Against the wall thus coated with impurities the body or heavier constituent of the milk is formed under the well-known action of centrifugal force in a vertical belt or stratum, the inner line of which stratum is ultimately well defined, and against the inner line or face of this vertical stratum of milk the lighter globules of cream gradually form in a corresponding vertical belt or annulus, within which is the vortex or center of the drum, so that the first stage may be designated as one of centrifugal separation. Second, while the drum is slowly subsiding from its maximum velocity and gradually dying down to a state of rest the centrifugal force gradually diminishes, and with the diminution of this force the law of gravitation gradually supervenes, and the milk and the cream slowly and gradually tend to assume a horizontal position in the drum; but the subsidence of the speed of rotation and the corresponding subsidence of the milk and the cream is so slow and gradual that the heavier body of the milk ultimately finds its level in a distinct horizontal stratum below, while the lighter annulus of cream finds its level in a distinct horizontal stratum above the milk, and thus the separation effected by the centrifugal force is maintained undisturbed while the drum is coming to a rest. This stage we may designate as one of "subsidence" or "gravitation," and the operation may accordingly be defined as creaming milk by centrifugal separation and gravitation. For the conduct of this process we have invented and constructed our improved apparatus, in which the operation of creaming milk is quickly and effectively accomplished, the success of the operation being attributable to the fact that the contents of the drum are not subjected to any jerk, or to any vibratory motion which would disturb the separation when once completed, as the tension of the driving-belt is kept uniform and the machine is slowly started and gradually stopped. The whole apparatus may also be readily cleaned, and at the same time is so constructed as to preclude accidents from the greatest speed attained.

In the drawings, A represents a cylinder or drum, of suitable material, which is poised by a central conical bearer, B, on the upper end of a vertical spindle, C. The conical bearer B is made in one piece with the bottom of the drum, or riveted to the same, and connected with the spindle, so as to be revolved thereby. The sides and bottom of the drum A are made solid—that is to say, in contradistinction to the perforated baskets of ordinary centrifugal machines—without any perforations in its sides or bottom, and is open at the top, but provided with an inwardly-extending level or inclined guard flange or ring, A′, that is either permanently attached to the drum, or, preferably, screwed into the upper part of the same, to be taken hold of by handles *a*, which facilitate the detaching and inserting of the guard-flange. The flange, however, has to be screwed into the drum in a direction opposite to the direction of motion of the same, so that any possibility of loosening and detaching of the guard-flange is prevented, the flange, so screwed in, having a tendency to be seated tighter in the drum by the rapid motion of the same, so as to form a water-tight joint therewith.

The drum A is divided by radial partitions D into a number of sections, more or less, according to the size of the drum. The partitions D, which extend from the center to the circumference of the drum, are secured either in grooves of the side, bottom, and bearer of the drum, or held by retaining-pins, as shown in the drawings, or in other manner, so as to be readily removed and reinserted. The partitions extend up to the guard-flange, at and toward the circumference of the drum, but near the center are only made about the height of the bearer B, and are preferably fastened by the washer and nut, by which the bearer is attached to the spindle. The partitions may be made of one piece, or of two sections connected by groove-and-tongue joint, as found most convenient. The drum A is inclosed by a cylindrical safety casing or jacket, E, with a removable top flange or cover, E′, for the prevention of that class of accidents to which centrifugal machines are liable. The cover E′ is secured by screw-bolts passing through slots in the cover and fastening-nuts. The casing or jacket E is firmly secured by a cast-iron base-plate, E², to the bed-frame of the machine, and broken out at diametrically-opposite sides for the driving-belt. The spindle C is supported on a step, *b*, of the base-plate, and by a bearing or sleeve, *d*, on radial arms E³, that are screwed to the jacket a small distance below the drum, the arms or braces being cushioned, to take up the vibrations of the spindle, by rubber plates *e*, interposed between the ends of the arm and the jacket. The step *b* is provided with a brass bearing, *b'*, having outer concaved sides that provide for the oscillations of the spindle, and with a cushioning-gasket and oil-cup; also, with an interchangeable step-plate, and a plug for drawing off the spent oil, as shown in Fig. 2. The upper bearing of the spindle is provided with a journal-box, which, to neutralize the oscillations of the spindle, is cushioned by interposed rubber rings, the journal-box being secured to the bearer or sleeve *d* by a suitable set-screw.

The spindle C is provided with a belt-pulley, around which the driving-belt passes, the belt being set in motion by the fly-wheel of the driving-shaft of any suitable motor. An idler, F, at the end of an elbow-lever, F', which is pivoted to an adjustable plate on the bed-frame, regulates the tension of the driving-belt. The extended arm of the elbow-lever is provided with an adjustable weight, by which the tension on the belt may be made greater or less or entirely removed.

A registering appliance for counting the number of revolutions of the drum may be arranged in any suitable manner in connection with the vertical spindle.

The apparatus is operated as follows: The milk is placed, in a fresh state, in the drum, so as to fill the sections to about the height of the bearer B, and the drum is then slowly started by pressing the idler lightly against the driving-belt. This pressure is gradually increased until the drum attains its maximum velocity, at which speed it is allowed to revolve for about twenty minutes, during which time the separation of the cream from the blue milk is obtained, through the greater specific gravity of the latter, which is thrown up along the wall and against the top flange, while the lighter cream collects nearer to the center. The completion of the process depends now on the stopping of the machine in such a manner that this separation of the milk and cream is maintained, so that they may be separately drawn off. This is accomplished by stopping the drum slowly, without jerks, which is effected by raising the weighted arm of the elbow-lever, so that the idler entirely clears the belt and takes off the tension, thus leaving the drum to continue revolving only by its momentum, which gradually diminishes until the drum assumes a state of rest. After a few minutes of rest, the cream may be skimmed off, the partition-walls being first carefully taken out for facilitating its removal. The milk is then drawn off, either by means of a siphon or through apertures in the bottom of the drum, which have meanwhile been closed by screw-plugs *f*. The water afterward used in washing the drum is also drawn off through these apertures, which, together with the removable partitions, admit of convenient and thorough cleaning of the apparatus, which is of great importance in such machines.

Having thus described the nature and objects of our invention, what we claim therein as new, and desire to secure by Letters Patent, is—

1. The combination, with the cylinder or drum having a conical center bearer, solid bottom and sides, and a top ring or flange, of removable radial partitions extending from the center to the circumference, but higher toward and at the circumference than at the center, substantially as and for the purposes described.

2. The combination of the revolving drum, the cushioned driving spindle, the surrounding safety-jacket, having cushioned arms with center bearing, and a base-plate with supporting base-step, substantially as described.

WILHELM C. L. LEFELDT.
CARL G. O. LENTSCH.

Witnesses:
WILLIAM C. FOX,
JOHS. KRACKE.